Oct. 12, 1943.    J. MURPHY    2,331,563
BRAKE SHOE
Filed Oct. 22, 1941    2 Sheets-Sheet 1
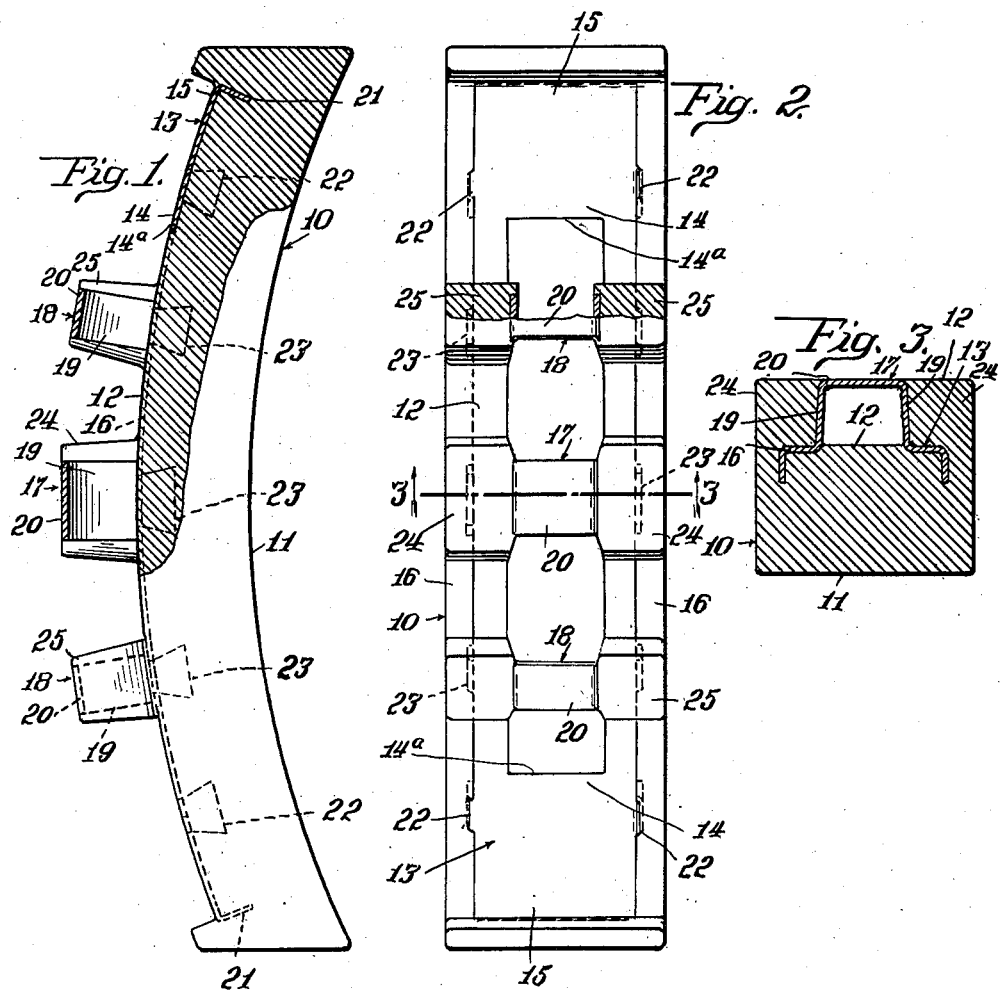
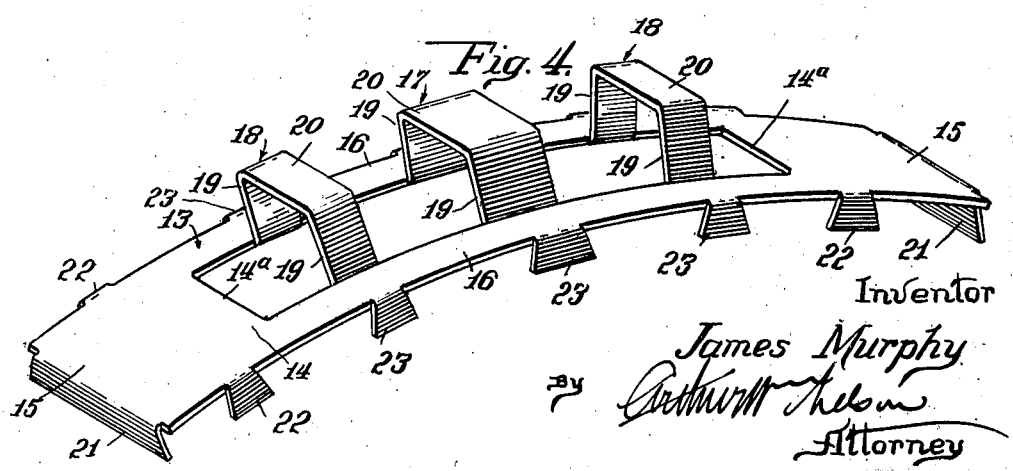
Inventor
James Murphy Oct. 12, 1943.   J. MURPHY   2,331,563
BRAKE SHOE
Filed Oct. 22, 1941   2 Sheets-Sheet 2
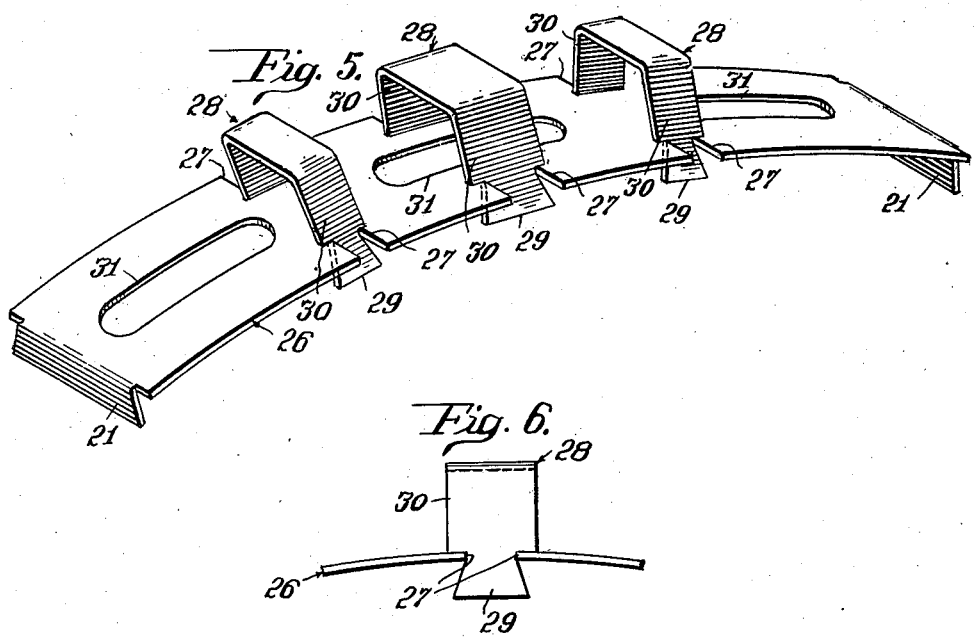
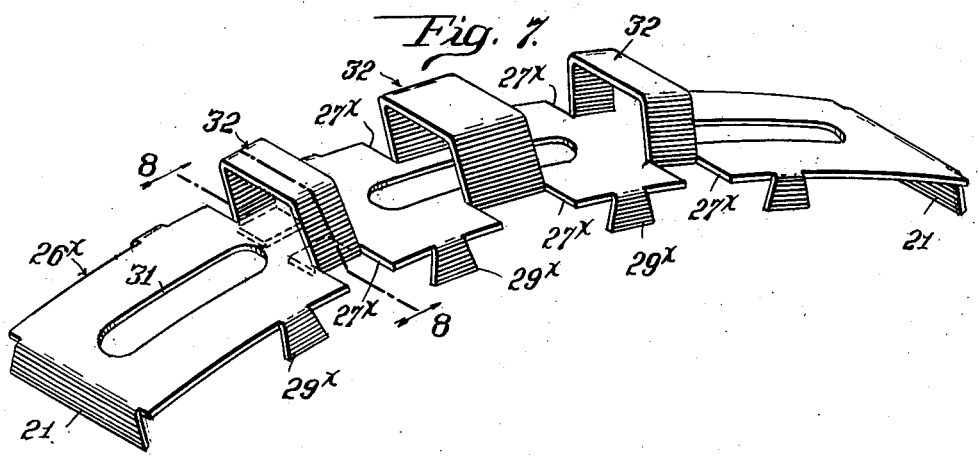
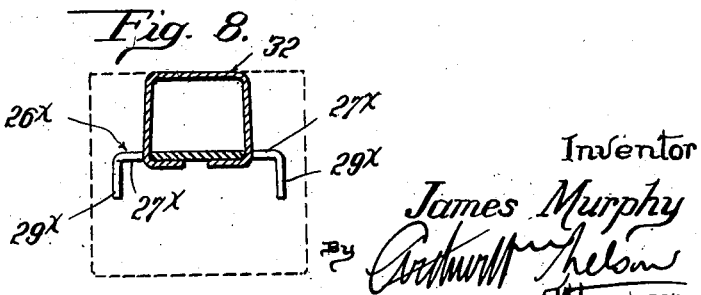
Inventor
James Murphy
By Arthur M. Nelson
Attorney Patented Oct. 12, 1943

2,331,563

UNITED STATES PATENT OFFICE 2,331,563

BRAKE SHOE

James Murphy, Chicago, Ill., assignor to Charles J. Cretors, Highland Park, Ill.

Application October 22, 1941, Serial No. 416,011

2 Claims. (Cl. 188—258)

This invention relates to improvements in brake shoes and it consists of the matters herein illustrated and described and more particularly pointed out in the appended claims.

The present invention is more especially concerned with brake shoes having a cast metal body with a reinforcing plate therein and as an example of such shoes, reference is made to my prior Patent #1,983,302 of December 4, 1934.

One of the objects of the present invention is to provide a brake shoe which, while of simple construction, is strong and durable and has a safety factor in that even though a part of the body of the shoe becomes broken in service, it will not drop from the remainder thereof.

Another object of the invention is to provide a brake shoe of this kind, in which the reinforcing plate, lug straps and anchoring tongues are so formed that they may be made from a single piece of metal or from a plurality of parts connected together as a unit so as to be more readily handled and accurately positioned, when placing the same in a mold, in which the shoe is cast.

Again, it is an object of the invention to provide a reinforcing member for a brake shoe that carries lug straps on one side thereof and anchoring tongues on the other side, which are so formed as to provide a secure and substantially non-separable locking connection between the reinforcing member and the brake shoe body in which it is employed, so that even though the body of the shoe becomes broken, parts thereof cannot fall away.

The above mentioned objects of the invention, as well as others, together with the advantages thereof will more fully appear as the specification proceeds.

In the drawings:

Fig. 1 is a view partly in side elevation and partly in longitudinal section of a brake shoe embodying the preferred form of the invention.

Fig. 2 is a view in elevation of the back of the brake shoe, parts being shown as broken away for a better illustration of the invention.

Fig. 3 is a transverse section through the brake shoe as taken on the line 3—3 of Fig. 2.

Fig. 4 is a perspective view of one form of reinforcing plate that may be employed in the improved brake shoe.

Fig. 5 is a perspective view of another form of reinforcing plate that may be employed in the improved brake shoe.

Fig. 6 is a fragmentary view in side elevation of a part of the reinforcing plate shown in Fig. 5 and more particularly illustrates the connection between one of the attachment lug straps and the body of the reinforcing plate.

Fig. 7 is a perspective view of still another form of reinforcing plate that may be employed in the improved brake shoe.

Fig. 8 is a transverse vertical sectional view through the reinforcing plate shown in Fig. 7 as taken on the line 8—8 thereof.

Referring now in detail to that embodiment of the invention illustrated in Figs. 1, 2, 3 and 4 of the accompanying drawings, the improved shoe includes a metallic body 10 of conventional shape having a braking surface 11 on the concaved front thereof and having a convexed back 12. Embedded in the back 12 of the body is a reinforcing element 13 best shown in perspective in Fig. 4.

The reinforcing element is in the form of an elongated metal plate-like body 14, which is shorter in length than the back of the body and which is also narrower than the width of the body and has a longitudinal curvature corresponding to the back of the body. The body of the reinforcing element has a longitudinal opening 14a therein which terminates short of the ends 15 of the body so that said ends of the body are connected together by lateral marginal parts 16—16.

17 and 18—18 indicate respectively, center and end loops or straps respectively projecting from the convex side of the element so as to span the opening 14a in the body. Each strap includes side legs 19—19 and a cross bar 20. The inner end of the side legs 19—19 are integral with and lead off from the inner edge of the margins 16—16 and taper slightly toward each other to meet and be joined to said cross bar 20. The extremity of each end portion 15 of the body is formed as a flange 21 that extends inwardly from the back portion, considering the curvature thereof. Each flange 21 is wider at its outer or free end than it is at that end where it joins the body and thus each flange has a substantially dovetail shape.

Along the outer edge of each end portion 15 and the marginal portions 16 of the plate body are inwardly extending anchoring tongues or tabs 22 and 23 respectively. Each tongue, as shown in Fig. 4, is wider at the outer end than at the inner end where it joins the body of the plate and therefore takes on a substantially dovetail shape. In this particular instance, the tongues are all formed as integral parts of the body as shown in Fig. 4 and the tongues 23—23 are disposed in the transverse planes of the lug straps 17 and 18 respectively while the tongues 22—22 are disposed in a plane between the end of the slot 14 and the end extremities of the body as a whole.

When a reinforcing member, such as just described, is embodied in a brake shoe, it is embedded in the back of the body so as to present a convexed surface flush with that of the back of the body. In this condition, the flanges 21 and the anchoring tongues or tabs 22—23 project toward the braking surface 11 of the body and as they are embedded in the metal of the body, they provide a positive lock between the reinforcing member and the body 10 of the brake shoe. Therefore, even though the body 10 cracks or breaks in service, no part thereof can drop away from the reinforcing plate.

Also, when the reinforcing plate described is embodied in a brake shoe, the side legs 19 of the straps 17 and 18 are embedded in the laterally separated lugs of longitudinally spaced pairs of attaching and abutment lugs 24 and 25 respectively, the cross bar 20 of each strap extending between the outer ends of the lugs of the associated pair of lugs.

In Fig. 5 I have illustrated a slightly modified form of reinforcing plate indicated as a whole at 25. In such a plate there is provided in the lateral margins thereof, recesses 27—27. In this instance, the lug straps which are indicated as a whole at 28 are substantially U shaped and the free ends 29 of the side legs 30 thereof have a dovetail shape so that the inner portion of said tongues fit snugly and lock in the recesses with a keystone-like action. With such an arrangement, any form of "key" openings may be employed in the body of the plate as for instance the elongated openings 31—31. Each end of the body may also have an inturned flange 21$x$ similar to the flanges 21—21 before mentioned. With such a construction, the lug straps may be pressed into place in the body of the plate and when such a reinforcing element is embedded in the brake shoe body, it is securely locked in place therein so that even though the body break transversely or otherwise, the broken parts cannot drop away from the reinforcing plate.

In Fig. 7, I have illustrated another form of reinforcing plate 26$x$ and wherein recesses 27$x$ are formed in opposite margins of the plate-like body and portions of said margins are formed as dovetailed locking tongues or tabs 29$x$ which are bent into a plane at a right angle to that of the body. In such a reinforcing plate, the loop-like lug straps, which are indicated at 32, have their side legs disposed in said recesses with bottom parts of each strap disposed beneath and fixed to the underside of those parts of the body between said recesses 27$x$ as best appears in Fig. 8. Each end of the body of the reinforcing plate 26$x$ may also have an inturned flange 26$y$ similar to the flanges 26 before mentioned.

When either of the reinforcing plates shown in Figs. 5 and 7 and just above described, are disposed in operative relation with respect to a shoe body, the dovetailed tongues thereof securely lock the plate to the body so that even should the body of the shoe break under service conditions, parts thereof cannot fall away from the reinforcing plate to drop to the track.

In the structures shown in Figs. 5 and 7, it is to be understood that the side portions of the loop straps will be embedded in the attachment lugs, in the manner described in connection with the structure shown in Figs. 1, 2, 3 and 4.

While in describing the invention, I have referred in detail to the form, arrangement and construction of the various parts involved, the same is to be considered only in the illustrative sense so that I do not wish to be limited thereto except as may be specifically set forth in the appended claims.

I claim as my invention:

1. A reinforcing element for a brake shoe embodying therein a plate-like body having a longitudinal slot therein, integral parts of said body being formed to provide loops that project from one face of the body and span said slot, other integral parts of the body at its margins being formed to project from the other face of the body and forming anchoring tongues therefor.

2. A reinforcing element for a brake shoe embodying therein a plate-like body having a longitudinal slot therein, integral parts of said body being formed to provide loops that project from one face of the body and span said slot, other integral parts of the body at its margins being formed to project from the other face of the body and forming anchoring tongues therefor, each of said other integral parts being wider at its outer end than it is at that end connected to the body.

JAMES MURPHY.